United States Patent
Suzuki

(10) Patent No.: US 11,403,921 B2
(45) Date of Patent: Aug. 2, 2022

(54) RADIO TAG READING DEVICE AND METHOD

(71) Applicant: TOSHIBA TEC KABUSHIKI KAISHA, Tokyo (JP)

(72) Inventor: Shigeaki Suzuki, Gotemba Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/183,699

(22) Filed: Feb. 24, 2021

(65) Prior Publication Data

US 2021/0183211 A1     Jun. 17, 2021

Related U.S. Application Data

(63) Continuation of application No. 16/653,115, filed on Oct. 15, 2019, now Pat. No. 10,970,977.

(30) Foreign Application Priority Data

Dec. 14, 2018 (JP) .............................. JP2018-234006

(51) Int. Cl.
*G06K 7/10* (2006.01)
*G07G 1/00* (2006.01)
*G06Q 20/18* (2012.01)

(52) U.S. Cl.
CPC ......... *G07G 1/009* (2013.01); *G06K 7/10316* (2013.01); *G06Q 20/18* (2013.01); *G07G 1/0018* (2013.01)

(58) Field of Classification Search
CPC ........ G07G 1/009; G07G 1/0018; G07G 1/12; G07G 5/00; G06K 7/10316; G06K 7/10128; G06Q 20/18
See application file for complete search history.

(56) References Cited

U.S. PATENT DOCUMENTS

| | | | |
|---|---|---|---|
| 9,261,398 B2 * | 2/2016 | Amundsen | G06K 7/10594 |
| 2007/0040024 A1 | 2/2007 | Murofushi et al. | |
| 2010/0288837 A1 | 11/2010 | Tomiyama et al. | |
| 2011/0000963 A1 | 1/2011 | Mercado et al. | |

FOREIGN PATENT DOCUMENTS

| | | |
|---|---|---|
| EP | 1755093 A1 | 2/2007 |
| EP | 2975551 A1 | 1/2016 |
| JP | 2007-264918 A | 10/2007 |

OTHER PUBLICATIONS

Extended European Search Report dated Feb. 7, 2020, filed in counterpart European Patent Application No. 19191429.0, 8 pages.

* cited by examiner

*Primary Examiner* — Jamara A Franklin
(74) *Attorney, Agent, or Firm* — Kim & Stewart LLP

(57) ABSTRACT

A radio tag reading device includes a placement table, an antenna, a reader, a sensor, and a controller. The antenna is configured to communicate with wireless tags within a communication range covering a placement region of the placement table. The reader is configured to output commodity information based on a signal received by the antenna from wireless tags. The sensor is configured to detect a user near the placement region of the placement table. The controller is configured to start a reading operation by activating the reader and causing the antenna to start emitting radio waves upon the sensor detecting the user near the placement region.

20 Claims, 5 Drawing Sheets

RADIO TAG READING DEVICE AND METHOD

CROSS-REFERENCE TO RELATED APPLICATIONS

This application is a continuation of U.S. patent application Ser. No. 16/653,115, filed on Oct. 15, 2019, which is based upon and claims the benefit of priority from Japanese Patent Application No. 2018-234006, filed on Dec. 14, 2018, the entire contents of each of which are incorporated herein by reference.

FIELD

Embodiments described therein relate generally to a radio tag reading device and a method.

BACKGROUND

In the related art, there are commodity sales data processing devices that read commodity information from RFID tags (RFID chips) attached to each commodity and perform sales registration and an accounting process based on the commodity information. For example, a reading device that reads commodity information en bloc for multiple commodities placed on a checkout counter in which a planar antenna is embedded has been proposed.

The reading device of this type has a configuration in which the commodity information of several commodities can be read at once the reading device obtains commodity information in a potentially mixed state since all the commodities placed on the checkout counter are read at the same time (or nearly so). That is, there is a possibility of the various commodities themselves interfering with transmission and reception of radio waves used for reading the RFID tags on each commodity. With stacked commodities on the checkout counter being read there is a possibility of radio waves from the reading device will not reach every commodity on the checkout counter, and commodity information may not be read appropriately from all the commodities.

DETAILED DESCRIPTION

Embodiments provide a radio tag reading device and a method capable of reliably reading commodity information of commodities.

In general, according to an embodiment, a radio tag reading device includes a placement table, an antenna, a reader, a sensor, and a controller. The antenna is configured to communicate with one or more wireless tags within a communication range including a placement region on the placement table. The reader is configured to output commodity information based on a signal received by the antenna. The sensor is configured to detect a user at a position proximate to the placement region. The controller is configured to start a reading operation by activating the reader and causing the antenna to start emitting radio waves upon the sensor detecting the user.

Hereinafter, example embodiments will be described with reference to the appended drawings.

Description of Overall Configuration of Radio Tag Reading Device

Figure 1:
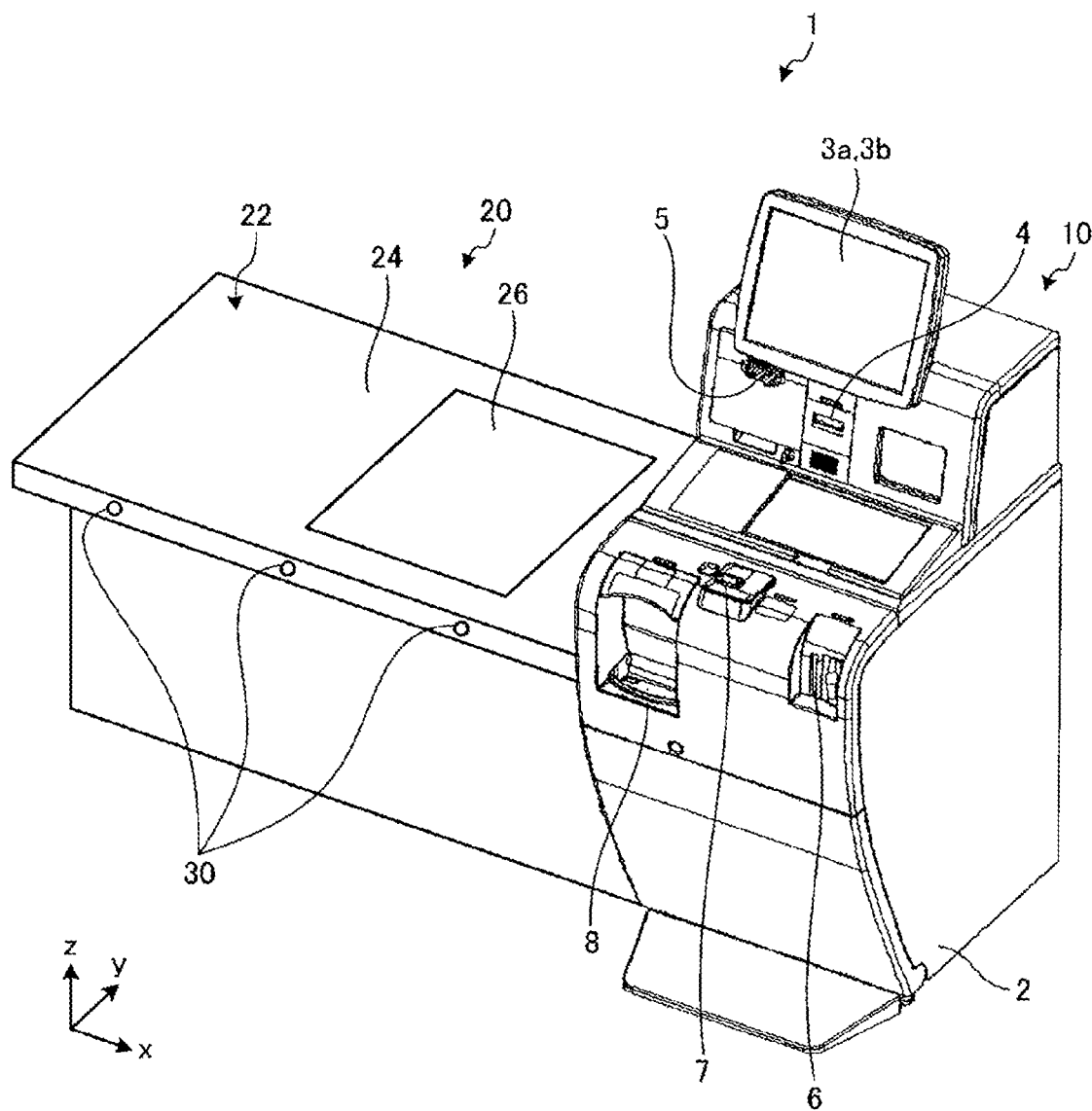
FIG. 1 illustrates an external view of an example of a self-checkout device according to an embodiment.

FIG. 1 illustrates an external view of an example of a self-checkout device 1 according to an embodiment. The self-checkout device 1 is installed in, for example, a store such as a supermarket. The self-checkout device 1 is a device called a so-called point of sales (POS) device in which commodities purchased by a customer is registered by the customer by himself or herself so that accounting is performed. The self-checkout device 1 is an application example of a radio tag reading device.

The self-checkout device 1 includes a POS terminal 10 and a registration counter 20.

A body 2 of the POS terminal 10 includes a monitor 3b in which a touch panel 3a is arranged on its surface. For example, a liquid crystal display is used as the monitor 3b.

The body 2 of the POS terminal 10 includes a card insertion port 4 into which a point card or a credit card of a customer is inserted in settlement and a receipt issue port 5 which issues a receipt. The card insertion port 4 communicates with a card reader 36 (see FIG. 4) to be described below and the receipt issue port 5 communicates with a receipt printer 37 (see FIG. 4) to be described below.

The body 2 of the POS terminal 10 includes a paper money deposit and withdrawal port 6 into which paper money for settlement is deposited and paper money for change is received, a coin insertion port 7 into which coins are inserted in settlement, and a coin extraction port 8 into which change coins are received. The paper money deposit and withdrawal port 6, the coin insertion port 7, and the coin extraction port 8 communicate with a change machine 35 (see FIG. 4) to be described below.

The registration counter 20 of the self-checkout device 1 includes a top plate 22. The registration counter 20 is an example of a placement table. The top plate 22 is a substantially smooth plate. The top plate 22 is formed of, for example, wood or acryl through which radio waves radiated from an RFID antenna 32 (see FIG. 2) to be described below are transmitted. The top plate 22 includes a temporary placement region 24 on which a customer temporarily places commodities purchased by the customer and a placement region 26 on which the customer places the commodities so that commodity information is read. The placement region 26 is preferably formed of a different material or with different color from the temporary placement region 24 so that the customer can easily see the placement region 26. Alternatively, a range of the placement region 26 may be drawn in the top plate 22. The customer is an example of an operator.

On a side surface of the registration counter 20, an infrared sensor 30 is provided to face a customer. The infrared sensor 30 detects that a customer approaches the registration counter 20 by detecting infrared light emitted from a human body.

Description of Internal Structure of Registration Counter

Figure 2:
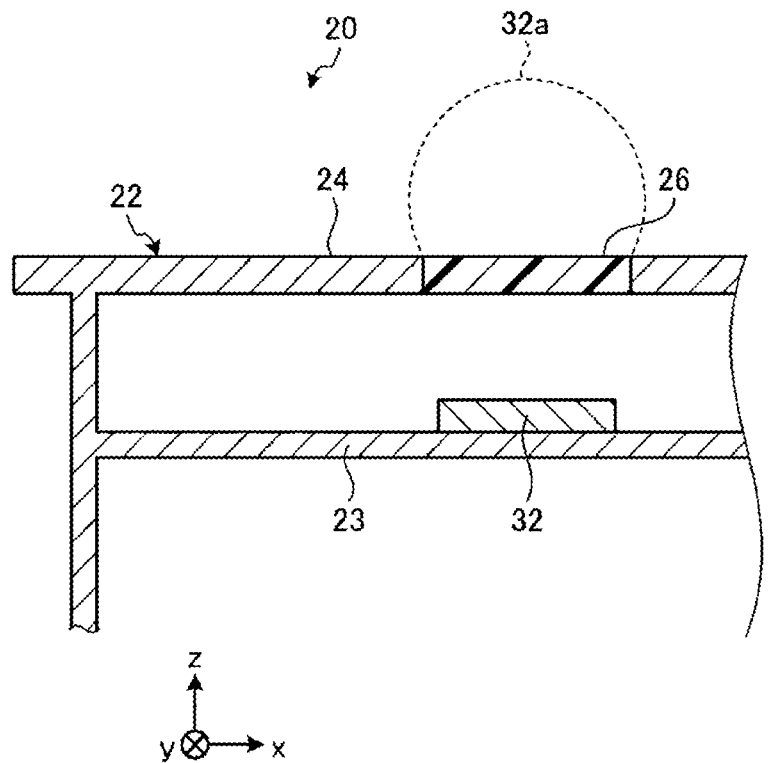
FIG. 2 illustrates a cross-sectional view of an example of a registration counter.

FIG. 2 illustrates a cross-sectional view of an example of the registration counter 20. In particular, FIG. 2 illustrates a cross-sectional view taken along the line xz plane of the registration counter 20 illustrated in FIG. 1. The registration counter 20 includes a partition plate 23 parallel to the top plate below the top plate 22. An RFID antenna 32 is installed below the placement region 26 in the partition plate 23.

The RFID antenna 32 radiates radio waves toward the upper side (the positive direction of the z axis). The radiated radio waves transmit through the top plate 22 (more specifically, the placement region 26) to form a radiation range 32a above the top plate 22. The radiation range 32a may be referred to as a communication range.

The installation position of the RFID antenna 32 illustrated in FIG. 2 and a radiation direction of the radio waves are given as an example and thus is not limited thereto. For example, the RFID antenna 32 may be installed to be erect on the top plate 22 of the registration counter 20 in parallel to the yz plane and radiate radio waves in the negative direction of the x axis. In this case, the radio waves are radiated to the placement region 26 in the negative direction of the x axis to form a radiation range of the radio waves in a region including the placement region 26.

Description of Reading Operation for Commodity Code

Figure 3:
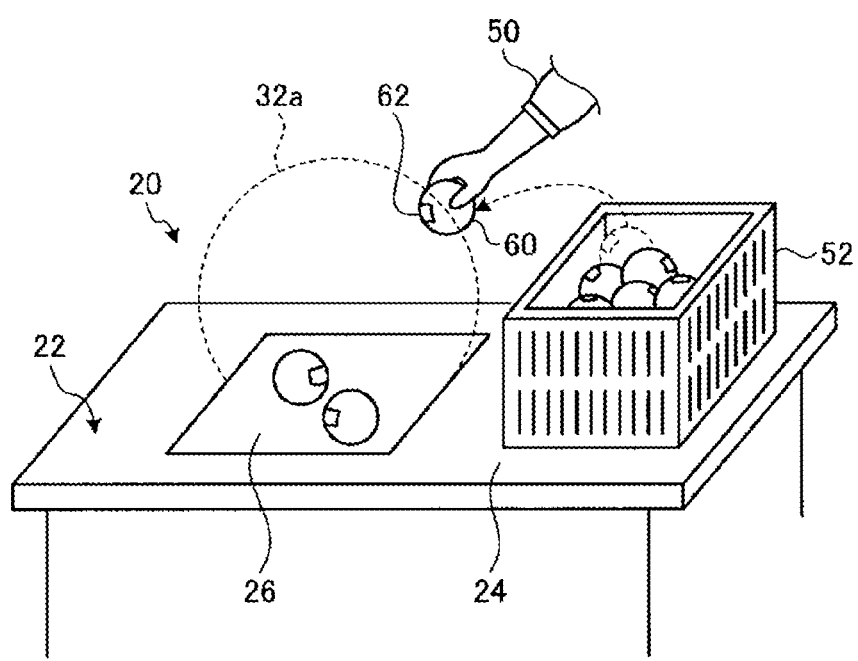
FIG. 3 is a diagram illustrating a state in which a customer takes out commodities from a basket and commodities are placed in a predetermined placement region of a registration counter.

FIG. 3 is a diagram illustrating a state in which a customer 50 takes out a commodity 60 from a basket 52 and the commodities are placed in the predetermined placement region 26 of the registration counter 20. The customer 50 finishing shopping approaches the registration counter 20, carrying the basket 52 in which the commodity 60 is contained and temporarily places the basket 52 in the temporary placement region 24. Thereafter, the customer 50 takes out the commodity 60 contained in the basket 52 and places the commodity 60 in the placement region 26.

Each integrated circuit (IC) tag 62 is attached to the commodity 60. The IC tag 62 is, for example, a radio frequency identification (RFID) tag. The IC tag 62 stores tag information. The tag information is, for example, commodity information such as ID (for example, a commodity code) with which the commodity 60 can be identified. The IC tag 62 is an example of a radio tag.

The IC tag 62 is active when the RFID antenna 32 installed inside the registration counter 20 receives radio waves radiated across the radiation range 32a. Then, the IC tag 62 transmits tag information stored in the IC tag 62 as a respond signal to the RFID antenna 32. The RFID antenna 32 receives the response signal from the IC tag 62 and transmits the response signal to the POS terminal 10. Then, the POS terminal 10 recognizes the commodity information of the commodity 60 to which the IC tag 62 is attached from the response signal received by the RFID antenna 32.

The radiation range 32a of the radio waves radiated by the RFID antenna 32 has a substantially spherical shape that extends above the placement region 26 of the registration counter 20, as described above. Accordingly, while the customer 50 takes out the commodity 60 from the basket 52 and places the commodity 60 in the placement region 26, the commodity 60 enters the radiation range 32a of the radio waves. Accordingly, the IC tag 62 attached to the commodity 60 receives the radio waves radiated by the RFID antenna 32 and is activated before the commodity 60 is placed in the placement region 26. The IC tag 62 outputs tag information as a response signal. The RFID antenna 32 receives the response signal and delivers the received tag information to the POS terminal 10. The POS terminal 10 acquires commodity information such as a commodity name or a price of the commodity 60 by comparing the transmitted tag information to a PLU file F1 (see FIG. 4) to be described below.

In FIG. 3, the customer 50 places the commodities 60 one by one in the placement region 26, as described above. However, the customer 50 may directly place the basket 52 in which the commodities 60 are contained in the placement region 26. In this case, when the basket 52 enters the radiation range 32a of the radio waves, the IC tag 62 receiving the radio waves is activated and outputs the tag information. That is, the tag information starts to be read before the basket 52 is placed in the placement region 26. Therefore, a readable range of the IC tag 62 (a position and a posture of the commodity 60 in the basket 52) can be expanded more than when the reading starts after the basket 52 is placed in the placement region 26.

Description of Hardware Configuration of Radio Tag Reading Device

Figure 4:
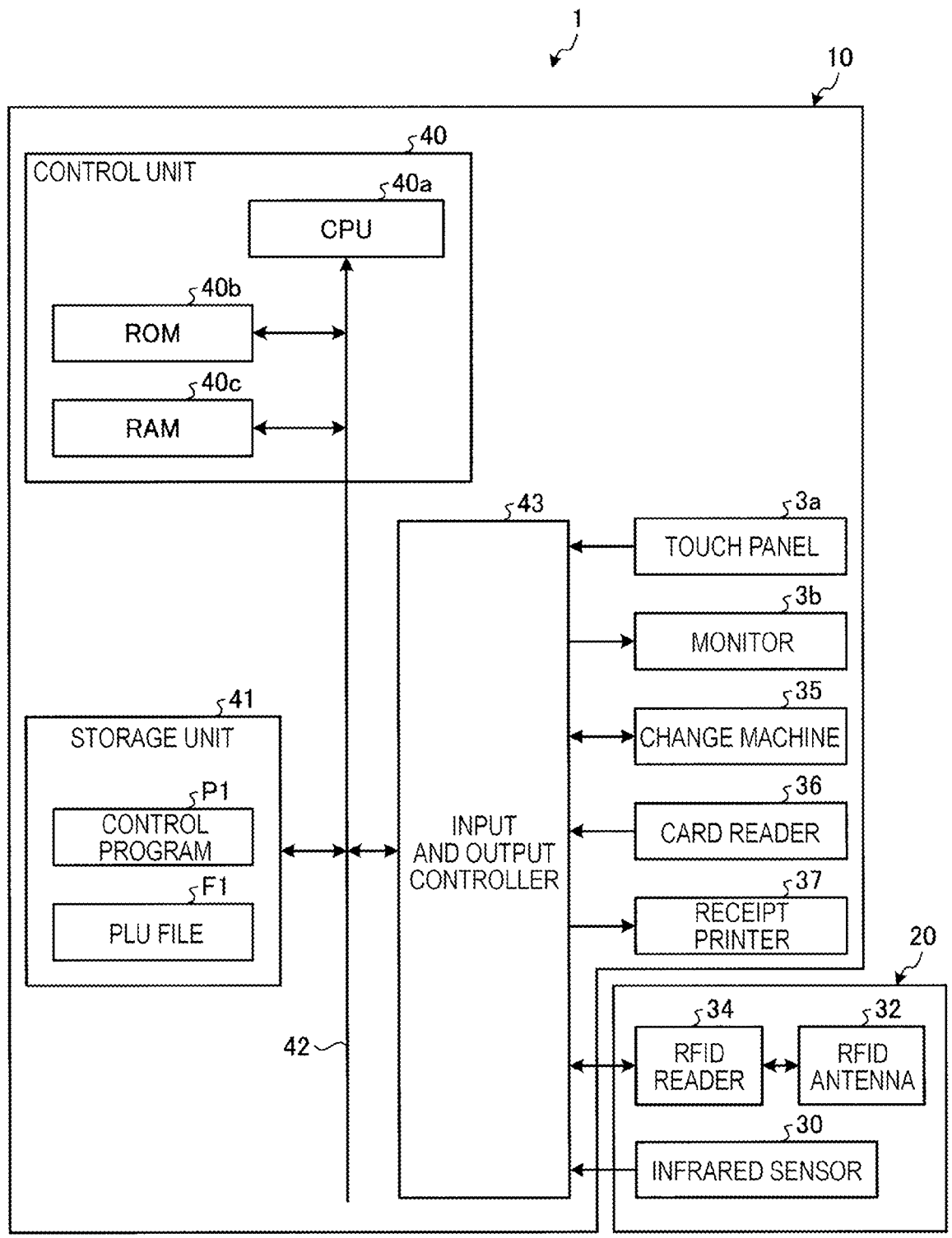
FIG. 4 is a hardware block diagram illustrating an example of a hardware configuration of the self-checkout device.

FIG. 4 is a hardware block diagram illustrating an example of a hardware configuration of the self-checkout device 1 according to an embodiment. The self-checkout device 1 includes a control unit 40, a storage unit 41, and an input and output controller 43.

The control unit 40 includes a central processing unit (CPU) 40a, a read-only memory (ROM) 40b, and a random access memory (RAM) 40c. The CPU 40a is connected to the ROM 40b and the RAM 40c via a bus line 42. The CPU 40a loads various programs stored in the ROM 40b or the storage unit 41 in the RAM 40c. The CPU 40a controls the self-checkout device by operating in accordance with the various programs loaded in the RAM 40c. That is, the control unit 40 has a general computer configuration.

The control unit 40 is further connected to the storage unit 41 and the input and output controller 43 via the bus line 42.

The storage unit 41 is a nonvolatile memory such as a flash memory, a hard disk drive (HDD), or the like that retains stored information even when power is turned off. The storage unit 41 stores programs including a control program P1. The control program P1 is a program that implements a function of the self-checkout device 1.

The control program P1 may be embedded in advance in the ROM 40b for supply. The control program P1 may be recorded in a computer-readable recording medium such as a CD-ROM, a flexible disc (FD), a CD-R, or a digital versatile disc (DVD) in a file of an installable format or an executable format in the control unit 40 for supply. Further, the control program P1 may be stored on a computer connected to a network such as the Internet and may be downloaded via a network for supply. The control program P1 may be supplied or distributed via a network such as the Internet.

The storage unit 41 stores the PLU file F1. The PLU file F1 is a file that stores the commodity information (a commodity code, a commodity name, a price, or the like) of the commodity 60 handled in a store. Since the commodity 60 handled in the store varies daily, the PLU file F1 is frequently updated from a server device (not illustrated) connected to the POS terminal 10.

The input and output controller 43 is connected to the touch panel 3a, the monitor 3b, the change machine 35, the card reader 36, the receipt printer 37, an RFID reader 34, the RFID antenna 32, and the infrared sensor 30. The input and output controller 43 controls various kinds of connected hardware based on instructions from the control unit 40. The control unit 40, the storage unit 41, the input and output controller 43, the touch panel 3a, the monitor 3b, the change machine 35, the card reader 36, and the receipt printer 37 are contained in the POS terminal 10. The RFID reader 34, the RFID antenna 32, and the infrared sensor 30 are contained in the registration counter 20.

The touch panel 3a detects operation information of an operator on various buttons displayed on the monitor 3b and transmits information in accordance with the operation information to the control unit 40. Instead of the touch panel 3a, mechanical switches may be provided in the body 2 of the POS terminal 10.

The monitor 3b displays various buttons for operating the self-checkout device 1 or commodity information or the like read by the self-checkout device 1.

When the customer 50 pays a purchase price of the commodity 60 in cash, the change machine 35 receives paper money and coin paid by the customer 50 and withdraws change money as necessary.

When the customer 50 performs credit card settlement or makes a payment with a card in which electronic money is registered, the card reader 36 reads content of the card.

The receipt printer 37 prints a transaction result for the customer 50 on a receipt and issues the receipt.

The RFID reader 34 radiates radio waves to the radiation range 32a via the connected RFID antenna 32. Then, the RFID reader 34 reads a response signal received by the RFID antenna 32 from the IC tag 62.

The infrared sensor 30 detects approach of the customer 50 to the registration counter 20. When the approach of the customer 50 can be detected, a sensor to be used is not limited to the infrared sensor 30. For example, the approach of the customer 50 may be detected using an ultrasonic sensor. Alternatively, a pressure sensor may be buried in a floor surface near the registration counter 20 and the pressure sensor may detect reception of a pressure to detect approach of the customer 50.

Description of Functional Configuration of Radio Tag Reading Device

Figure 5:
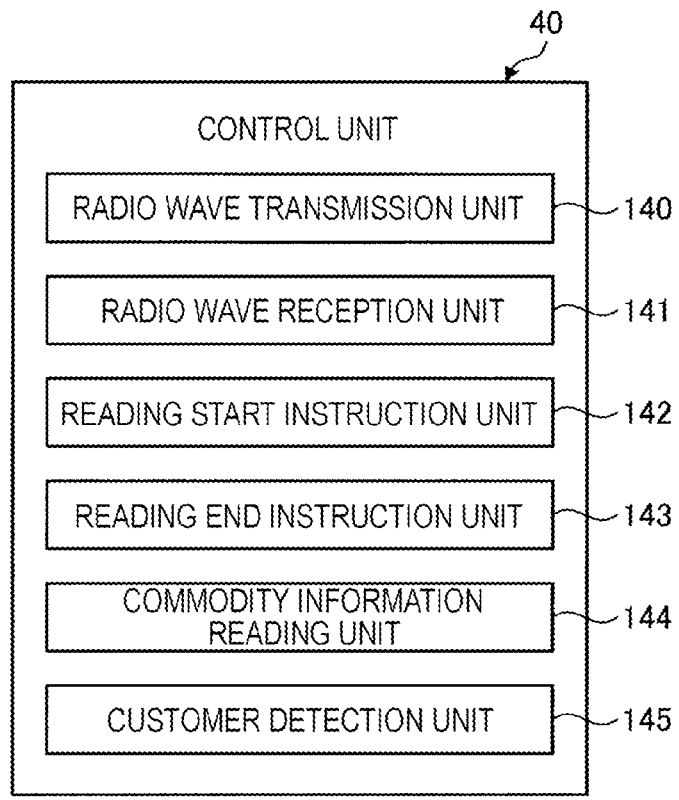
FIG. 5 is a functional block diagram illustrating an example of a functional configuration of the self-checkout device.

FIG. 5 is a functional block diagram illustrating an example of a functional configuration of the self-checkout device 1 according to an embodiment. When the control program P1 is loaded in the RAM 40c and is operated, the control unit 40 of the self-checkout device 1 functions as a radio wave transmission unit 140, a radio wave reception unit 141, a reading start instruction unit 142, a reading end instruction unit 143, a commodity information reading unit 144, and a customer detection unit 145 illustrated in FIG. 5 as functional units. The control unit 40 additionally includes a commodity registration processing unit that registers commodity information of commodities purchased by a customer and an accounting processing unit that settles the registered commodities, which are usually performed by the POS terminal 10, but these units are not illustrated since these units are not main elements according to the embodiment.

The radio wave transmission unit 140 transmits radio waves for communication with the IC tag 62 toward at least a predetermined region including the placement region 26 in which the customer 50 places the commodity 60 in the registration counter 20 (also referred to as a placement table) on which the commodity 60 to which the IC tag 62 (also referred to as a radio tag) storing the commodity information is attached is placed. The radio wave transmission unit 140 is an example of a transmission unit.

The radio wave reception unit 141 receives a response signal including the commodity information from the IC tag 62 in response to the radio waves transmitted by the radio wave transmission unit 140. The radio wave reception unit 141 is an example of a reception unit.

The reading start instruction unit 142 starts operations of the radio wave transmission unit 140 and the radio wave reception unit 141, in general, before a commodity has been placed on the placement region 26. The reading start instruction unit 142 is an example of a reading start unit. In an embodiment, that operations can be started in response to a signal from a sensor indicating an approach of a customer or the like.

The reading end instruction unit 143 ends operations of the radio wave transmission unit 140 and the radio wave reception unit 141. The reading end instruction unit 143 is an example of a reading end unit.

The commodity information reading unit 144 reads the commodity information from the response signal received by the radio wave reception unit 141. The commodity information reading unit 144 is an example of a reading unit.

The customer detection unit 145 detects approach of the customer 50 to the registration counter 20 (the placement table).

Description of Flow of Process Performed by Self-Checkout Device

Figure 6:
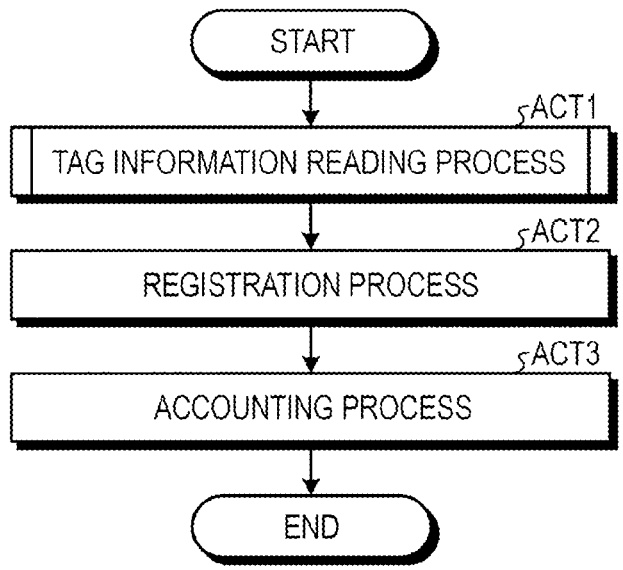
FIG. 6 is a flowchart illustrating an example of a flow of a process performed by the self-checkout device.

FIG. 6 is a flowchart illustrating an example of a flow of a process performed by the self-checkout device 1 according to an embodiment.

The RFID reader 34 starts a tag information reading process of reading tag information (ID) from the IC tag 62 at a timing before the commodities 60 purchased by the customer 50 is placed in the placement region 26 (ACT1). A detailed flow of the tag information reading process will be described below (see FIG. 7).

Subsequently, the registration processing unit (not illustrated) of the POS terminal 10 performs a registration process of registering the commodities 60 indicated by the tag information (ID) read in the tag information reading process (ACT2). Since the registration process is a process normally performed by a known POS terminal, detailed description will not be made.

Further, the accounting processing unit (not illustrated) of the POS terminal 10 performs an accounting process on the commodities 60 registered through the registration process (ACT5). Specifically, the POS terminal 10 calculates a sum price of the commodities registered through the registration process. The POS terminal 10 receives payment from the customer and calculates a change amount when an amount of money received from the customer is greater than the sum price. The POS terminal 10 returns the change to the customer. Further, when the customer wants to perform card settlement, the POS terminal 10 reads card information inserted into the card reader 36 by the customer to perform settlement. Since the accounting process is a process normally performed by a known POS terminal, detailed description will not be made.

Description of Flow of Tag Information Reading Process

Figure 7:
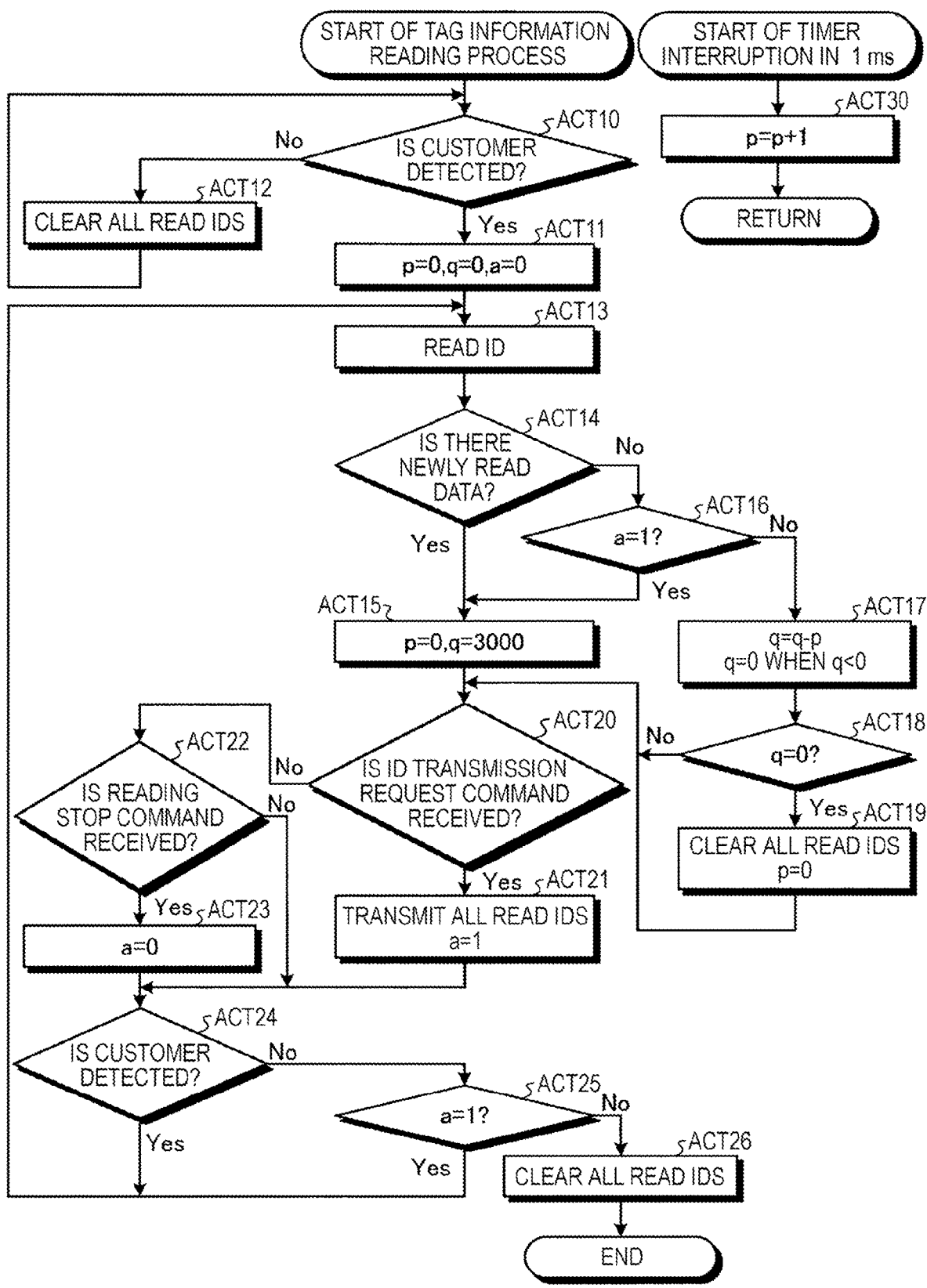
FIG. 7 is a flowchart illustrating an example of a flow of a tag information reading process performed by the self-checkout device.

FIG. 7 is a flowchart illustrating an example of a flow of a tag information reading process performed by the self-checkout device 1 according to an embodiment. The RFID reader 34 performs the tag information reading process based on an instruction of the control unit 40.

First, the customer detection unit 145 determines whether the customer 50 is detected (ACT10). When it is determined that the customer 50 is detected (Yes in ACT10), the process proceeds to ACT11. Conversely, when it is determined that the customer 50 is not detected (No in ACT10), the process proceeds to ACT12.

When it is determined in ACT10 that the customer 50 has been detected, the reading start instruction unit 142 resets a timer counter p and a time value q and sets a reading state flag a to 0 in ACT11. Thereafter, the process proceeds to ACT13. Subsequently, a state of the tag information reading process is controlled with the timer counter p, the time value q, and the reading state flag a. The timer counter p is a timer count value in 1 ms units and increases (increments) whenever 1 ms elapses. The time value q corresponds to the amount of time that has passed since a reset. In the reading state flag a, a=1 is set when the tag information can be read, and a=0 is set when the tag information may not be read.

Conversely, when it is determined in ACT10 that the customer 50 has not been detected, the commodity information reading unit 144 clears all the stored tag information (IDs) in ACT12. Thereafter, the process returns to ACT10.

After ACT11, in ACT13, the reading start instruction unit 142 causes the radio wave transmission unit 140 to start transmitting radio waves from the RFID antenna 32. Then, the reading start instruction unit 142 causes the radio wave reception unit 141 to start receiving a response signal from the RFID antenna 32. Then, the commodity information reading unit 144 reads the tag information (ID) of the IC tag 62 entering the radiation range 32a. The commodity information reading unit 144 stores the read tag information of the IC tag 62.

The commodity information reading unit 144 determines whether there is newly read data in the tag information (ID) read in ACT13 (ACT14). When it is determined that there is the newly read data (Yes in ACT14), the process proceeds to ACT15. Conversely, when it is determined that there is no newly read data (No in ACT14), the process proceeds to ACT16.

When it is determined in ACT14 that there is not the newly read data, the reading start instruction unit 142 determines in ACT16 whether a=1 is set in the reading state flag a, that is, the tag information is being read. When it is determined that a=1 is set in the reading state flag a (Yes in ACT16), the process proceeds to ACT15. Conversely, when it is determined that a=1 is not set in the reading state flag a (No in ACT16), the process proceeds to ACT17.

When it is determined in ACT14 that there is the newly read data and it is determined in ACT16 whether a=1 is set in the reading state flag a, that is, the tag information is being read, the reading start instruction unit 142 resets the timer counter p and sets a value of 3000 ms as the time value q in ACT15. Thereafter, the process proceeds to ACT20. The value set as the time value q is given as an example and thus is not limited to 3000 ms.

After ACT15, the commodity information reading unit 144 determines whether an ID transmission command is received (ACT20). The ID transmission command is a command to transmit the tag information (ID) read by the commodity information reading unit 144 to the accounting (payment) processing unit of the POS terminal 10.

Specifically, when the customer 50 places the commodities 60 in the placement region 26 and then presses an ID transmission button displayed on the monitor 3b, the control unit 40 issues the ID transmission command. More specifically, the touch panel 3a detects that the ID transmission button is pressed. Then, when the touch panel 3a notifies that the ID transmission button is pressed, the control unit 40 issues the ID transmission command to transmit the ID transmission command to the RFID reader 34.

When it is determined that the ID transmission command is received (Yes in ACT20), the process proceeds to ACT21. Conversely, when it is determined the ID transmission command is not received (No in ACT20), the process proceeds to ACT22.

Here, the description returns to ACT16. When it is determined in ACT16 that a=1 is not set in the reading state flag a, the reading start instruction unit 142 updates the time value q (ACT17). Specifically, the reading start instruction unit 142 subtracts the timer counter p at that time from the time value q to set the new time value q. When the time value q becomes a negative number, q=0 is set.

Subsequently, the reading start instruction unit 142 determines whether the time value q is presently equal to 0 (ACT18). When it is determined that the time value q is 0 (Yes in ACT18), the process proceeds to ACT19. Conversely, when it is determined that the time value q is not 0 (No in ACT18), the process proceeds to ACT20.

When it is determined in ACT18 that the time value q is 0, the commodity information reading unit 144 clears all the stored tag information (IDs) and resets the timer counter p (ACT19). That is, when the newly tag information is not read in ACT13 in q=3000 set in ACT15, that is, over 3 seconds, the commodity information reading unit 144 clears the retained tag information. Thereafter, the process proceeds to ACT20.

In the self-checkout device 1, the reading of the IC tag 62 is automatically started when the customer 50 approaches the registration counter 20. Therefore, for example, when the customer 50 passing the vicinity of the registration counter 20 by chance carries the commodity 60 to which the IC tag 62 is attached, the self-checkout device 1 reads the information regarding the IC tag 62 in some cases. Here, since the customer 50 approaching the registration counter 20 by chance subsequently becomes away from the registration counter 20, the new IC tag 62 is rarely read in succession. Accordingly, in the self-checkout device 1 according to the embodiment, when new tag information is not read over a predetermined time (for example, for 3 seconds), the tag information read and stored until then is assumed to be cleared.

Again, the description returns to ACT20. When it is determined in ACT20 that the ID transmission command is received, the commodity information reading unit 144 transmits all the read and stored tag information (IDs) to the registration processing unit (not illustrated) of the POS terminal 10 and sets the reading state flag a to 1 in ACT21. Thereafter, the process proceeds to ACT24. The tag information transmitted to the registration processing unit is registered and processed in ACT2 of FIG. 6 described above.

FIG. 7 is a flowchart illustrating the flow of the process performed by the RFID reader 34. Therefore, although not described, the tag information (ID) transmitted to the registration process unit of the POS terminal 10 in ACT21 is converted into a specific commodity name by comparing the tag information to the PLU file F1. Then, through the registration process (ACT2) of FIG. 6 described above, the commodities are registered as the purchased commodities, and the commodity names, the prices, the number of commodities, and the like are displayed on the monitor 3b. The customer 50 checks the commodities purchased by the customer 50 are registered by checking the commodity names, the prices, the number of commodities, and the like which are displayed on the monitor 3b.

Conversely, when it is determined in ACT20 that the ID transmission command is not received, the commodity information reading unit 144 determines in ACT22 that a reading stop command is received. The reading stop command is a command to stop reading the tag information (ID). When it is determined in ACT22 that the reading stop command is received (Yes in ACT22), the process proceeds to ACT23. Conversely, when it is determined that the reading stop command is not received (No in ACT22), the process proceeds to ACT24.

Specifically, when the customer 50 checks the commodity information displayed on the monitor 3b to check that all the commodities purchased by the customer 50 are registered and presses a reading end button (not illustrated) displayed on the monitor 3b, the control unit 40 issues the reading stop command. More specifically, the touch panel 3a detects that the reading end button is pressed. Then, when the touch panel 3a notifies that the reading end button is pressed, the control unit 40 issues the reading stop command to transmit the reading stop command to the RFID reader 34.

When it is determined in ACT22 that the reading stop command is received, the reading start instruction unit 142 sets the reading state flag a to 0 in ACT23. Thereafter, the process proceeds to ACT24.

Conversely, when it is determined in ACT22 that the reading stop command is not received or after ACT21 or ACT23 is performed, the customer detection unit 145 determines whether the customer 50 is detected (ACT24). When it is determined that the customer 50 is detected (Yes in ACT24), the process returns to ACT13. Conversely, when it is determined that the customer 50 is not detected (No in ACT24), the process proceeds to ACT25.

When it is determined in ACT24 that the customer 50 is not detected, the reading start instruction unit 142 determines in ACT25 whether a=1 is set in the reading state flag a, that is, the tag information is being read. When it is determined that a=1 is set in the reading state flag a (Yes in ACT25), the process returns to ACT13. Conversely, when it is determined that a=1 is not set in the reading state flag a (No in ACT25), the process proceeds to ACT26.

When it is determined in ACT25 that a=1 is not set in the reading state flag a, the commodity information reading unit 144 clears all the stored tag information (IDs) in ACT26. Then, the process of FIG. 7 ends.

The timer counter p is sequentially added through an interruption process every 1 ms by an elapsing function of a 1 ms timer included in a CPU 40a, as illustrated in ACT30 of FIG. 7, while the tag information reading process is performed.

Description of Modification Examples of Embodiment

In the above-described embodiment, when the infrared sensor 30 detects that the customer 50 approaches the registration counter 20, the RFID reader 34 starts reading the IC tag 62. However, the RFID reader 34 may start reading the IC tag 62 at a timing at which the basket 52 is temporarily placed in the temporary placement region 24.

That is, a gravimetric sensor (not illustrated in FIG. 1) is installed inside or on the rear of the temporary placement region 24 of the top plate 22. Then, when the gravimetric sensor detects a predetermined weight exceeding the weight of the basket 52, the reading start instruction unit 142 may determine that the basket 52 in which the commodities 60 are contained is placed and cause the radio wave transmission unit 140 to start transmitting radio waves from the RFID antenna 32.

In such a configuration, the reading of the tag information can be started at a timing before the commodities 60 are placed in the placement region 26.

As described above, in the self-checkout device 1 (a radio tag reading device) according to the embodiment, the radio wave transmission unit 140 (the transmission unit) transmits a radio wave for communication with the IC tag 62 toward at least a predetermined region including the placement region 26 in which the customer 50 (the operator) places the commodity 60 on the registration counter 20 (the placement table) on which the commodity 60 with the IC tag (the radio tag) storing the commodity information is placed. Then, the reading start instruction unit 142 (the reading start unit) starts operations of the radio wave transmission unit 140 and the radio wave reception unit 141 (the reception unit) receiving a response signal including the commodity information from the IC tag 62 in response to the radio wave at a predetermined timing before the commodity 60 is placed in the placement region 26. Then, the commodity information reading unit 144 (the reading unit) reads the commodity information from the response signal received by the radio wave reception unit 141. Accordingly, it is possible to reliably read the commodity information of commodities 60 without being missed.

In the self-checkout device 1 (the radio tag reading device) according to the embodiment, the predetermined timing is a timing at which the customer 50 (the operator) approaches the registration counter 20 (the placement table). Accordingly, the RFID reader 34 can start reading the IC tag 62 at the timing before the customer 50 places the commodity 60 in the placement region 26.

In the self-checkout device 1 (the radio tag reading device) according to the embodiment, the predetermined timing is a timing at which the customer 50 (the operator) places the basket 52 in which the commodity 60 is contained near the placement region 26. Accordingly, the RFID reader 34 can start reading the IC tag 62 at the timing before the customer 50 places the commodity 60 in the placement region 26.

In the self-checkout device 1 (the radio tag reading device) according to the embodiment, the commodity information reading unit 144 (the reading unit) clears the commodity information read by the commodity information reading unit 144 when the commodity information is not readable over a predetermined time. Accordingly, for example, when a person other than the customer 50 crosses the vicinity of the registration counter 20, the commodity information read by the RFID reader 34 can be cleared.

The self-checkout device 1, which can be considered a radio tag reading device according to the embodiment ends the operations of the reading end instruction unit 143, the radio wave transmission unit 140 and the radio wave reception unit 141. Accordingly, when the reading of the IC tag 62 is completed, the radiation of the radio waves from the RFID antenna 32 and the reading of the tag information by the RFID reader 34 can be reliably ended.

While certain embodiments have been described these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A radio tag reading device, comprising:
   a placement table;
   an antenna configured to communicate with wireless tags within a communication range including a placement region on the placement table;
   a reader configured to output tag information based on a signal received by the antenna from wireless tags;
   a sensor configured to detect a user at a position proximate to the placement region;
   a user-operable element; and
   a controller configured to start a reading operation by activating the reader and causing the antenna to start emitting radio waves upon the sensor detecting the user, and terminate the reading operation in response to a user operation of the user-operable element.

2. The radio tag reading device according to claim 1, wherein the antenna is provided under the placement region along a surface of the placement region.

3. The radio tag reading device according to claim 1, wherein the sensor is an infrared sensor.

4. The radio tag reading device according to claim 1, wherein the sensor is configured to detect the user at a detection range that is beyond the communication range of the antenna.

5. The radio tag reading device according to claim 4, wherein the detection range includes a front region of the placement table.

6. The radio tag reading device according to claim 1, further comprising:
   a second user-operable element; and
   a data storage, wherein
   the controller is further configured to store tag information as output by the reader during the reading operation in the data storage, and output the stored tag information in response to a user operation of the second user-operable element.

7. The radio tag reading device according to claim 6, wherein the controller is further configured to clear the stored tag information in the data storage when the sensor no longer detects the user after the reading operation has been terminated.

8. The radio tag reading device according to claim 6, wherein the controller is further configured to clear the stored tag information in the data storage when the sensor still detects the user after the reading operation is terminated but no new tag information is output by the reader after a predetermined period of time has elapsed since the reading operation was terminated.

9. A radio tag reading device, comprising:
   a placement table;
   an antenna configured to communicate with wireless tags within a communication range including a placement region on the placement table;
   a reader configured to output tag information based on a signal received by the antenna from wireless tags;
   a weight sensor configured to detect an object on the placement table; and
   a controller configured to start a reading operation by activating the reader and causing the antenna to start emitting radio waves upon the weight sensor detecting an object on the placement table.

10. The radio tag reading device according to claim 9, wherein the antenna is provided under the placement region along a surface of the placement region.

11. The radio tag reading device according to claim 9, further comprising:
    a first user-operable element; and
    a data storage, wherein
    the controller is further configured to store tag information as output by the reader during the reading operation in the data storage, and output the stored tag information in response to a user operation of the first user-operable element.

12. The radio tag reading device according to claim 11, further comprising:
    a second user-operable element, wherein
    the controller is further configured to terminate the reading operation in response to a user operation of the second user-operable element.

13. The radio tag reading device according to claim 12, wherein the controller is further configured to clear the stored tag information in the data storage when the weight sensor no longer detects an object on the placement table after the reading operation has been terminated.

14. The radio tag reading device according to claim 12, wherein the controller is further configured to clear the stored tag information in the data storage when the weight sensor still detects an object on the placement table after the reading operation has been terminated but no new tag information is output by the reader after a predetermined period of time has elapsed since the reading operation was terminated.

15. A method of reading tag information from a wireless tag, comprising:
    detecting a user at a position proximate to a placement region on a placement table;
    when the user is detected at the position, starting a reading operation by causing an antenna to start emitting radio waves for reading wireless tags in the placement region and by activating a reader configured to output tag information based on a signal received by the antenna from the wireless tags; and
    terminating the reading operation in response to a user operation of a user-operable element.

16. The method according to claim 15, wherein detecting the user is performed with an infrared sensor.

17. The method according to claim 16, wherein the infrared sensor is configured to detect the user at a front region of the placement table.

18. The method according to claim 15, further comprising:
    storing, in a data storage, tag information output by the reader during the reading operation.

19. The method according to claim 18, further comprising:
    clearing the stored tag information when the user is no longer detected.

20. The method according to claim 19, further comprising:
   clearing the stored tag information after a predetermined period of time has elapsed after a termination of the reading operation.

* * * * *